United States Patent
Cronin et al.

(10) Patent No.: US 9,699,404 B2
(45) Date of Patent: Jul. 4, 2017

(54) CLOSED CAPTION ALIGNMENT (71) Applicant: MICROSOFT TECHNOLOGY LICENSING, LLC, Redmond, WA (US)

(72) Inventors: Dennis Cronin, Scottsdale, AZ (US); Frank Seide, Beijing (CN); Ian Kennedy, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/220,002

(22) Filed: Mar. 19, 2014

(65) Prior Publication Data

US 2015/0271442 A1    Sep. 24, 2015

(51) Int. Cl.
*H04N 7/088* (2006.01)
*G10L 15/26* (2006.01)
*H04N 21/43* (2011.01)
*H04N 21/439* (2011.01)
*H04N 21/488* (2011.01)

(52) U.S. Cl.
CPC .......... *H04N 7/0885* (2013.01); *G10L 15/26* (2013.01); *H04N 21/4307* (2013.01); *H04N 21/4394* (2013.01); *H04N 21/4884* (2013.01)

(58) Field of Classification Search
USPC ........................................ 348/461, 464, 468
See application file for complete search history.

(56) References Cited

U.S. PATENT DOCUMENTS

| 4,463,272 | A  | * | 7/1984 | Tucker .................. G01R 17/06 327/14 |
| 5,801,685 | A  | * | 9/1998 | Miller et al. ................... 715/202 |
| 6,505,153 | B1 | * | 1/2003 | Van Thong et al. .......... 704/211 |
| 6,937,988 | B1 | * | 8/2005 | Hemkumar ........... G10L 19/167 375/364 |
| 7,191,117 | B2 |   | 3/2007 | Kirby et al. |
| 7,231,351 | B1 | * | 6/2007 | Griggs .......................... 704/251 |
| 9,071,815 | B2 | * | 6/2015 | Palakshamurthy et al. .. 386/241 |
| 2002/0010916 | A1 |   | 1/2002 | Thong et al. |
| 2004/0078828 | A1 | * | 4/2004 | Parchman et al. ............ 725/135 |
| 2005/0042591 | A1 | * | 2/2005 | Bloom et al. ............. 434/307 A |
| 2005/0060145 | A1 |   | 3/2005 | Abe et al. |
| 2008/0002949 | A1 | * | 1/2008 | Tokunaka et al. .............. 386/96 |
| 2008/0122692 | A1 | * | 5/2008 | Houtman ................ G01S 19/30 342/357.68 |

(Continued)

FOREIGN PATENT DOCUMENTS

JP         2008199444 A      8/2008

OTHER PUBLICATIONS

Hazen, Timothy J., "Automatic Alignment and Error Correction of Human Generated Transcripts for Long Speech Recordings", INTERSPEECH 2006—ICSLP, Sep. 2006, pp. 1606-1609.

(Continued)

*Primary Examiner* — Paulos M Natnael
(74) *Attorney, Agent, or Firm* — Alleman Hall Creasman & Tuttle LLP (57) ABSTRACT

Aligning a closed caption track to a media content includes calculating the offset and the drift between the closed caption track and the media content item. The closed caption track is aligned to the media content item as a function of the calculated offset and drift.

20 Claims, 7 Drawing Sheets

(56) References Cited

U.S. PATENT DOCUMENTS

| | | | |
|---|---|---|---|
| 2011/0069230 A1* | 3/2011 | Polumbus et al. ............ | 348/468 |
| 2011/0134321 A1 | 6/2011 | Berry et al. | |
| 2011/0319100 A1* | 12/2011 | Flanagan ................ | G01S 5/021 |
| | | | 455/456.5 |
| 2012/0215903 A1* | 8/2012 | Fleischman et al. ......... | 709/224 |
| 2012/0303643 A1 | 11/2012 | Lau | |
| 2013/0060572 A1* | 3/2013 | Garland et al. ............... | 704/254 |
| 2013/0100347 A1 | 4/2013 | Zinovieva | |
| 2013/0120654 A1 | 5/2013 | Kuspa | |
| 2015/0003797 A1* | 1/2015 | Schmidt ................. | G11B 27/10 |
| | | | 386/201 |
| 2015/0369924 A1* | 12/2015 | Hedgecock ........... | G01S 5/0072 |
| | | | 342/357.34 |

OTHER PUBLICATIONS

Swaminathan, Ranjini et al., "Improving and Aligning Speech with Presentation Slides", 2010 International Conference on Pattern Recognition, Aug. 23, 2010, pp. 3280-3283.

ISA European Patent Office, International Search Report and Written Opinion issued in Application No. PCT/US2015/020315, May 29, 2015, Netherlands, 11 Pages.

Hauptmann et al., "Story Segmentation and Detection of Commercials in Broadcast News Video", In Proceedings of IEEE International Forum on Research and Technology Advances in Digital Libraries, Apr. 22, 1998, 12 pages.

* cited by examiner

| CAPTION 402 | DETECTIONS 404 |
|---|---|
| THE RAIN IN SPAIN<br><br>FALLS MOSTLY ON THE<br><br>406 | THE RAIN IN SPAIN<br><br>FALLS MOSTLY ON THE<br><br>408 |
| I AM THE VERY MODEL<br><br>OF A MODERN MAJOR<br><br>410 | I AM THE VERY MODEL<br><br>OF A MODERN MAJOR<br><br>412 |

| CAPTION WORD 416 | ESTIMATED SPEECH TIME 418 | PLAYBACK TIME OF RECOGNIZED SPEECH FRAGMENT/ WORD PAIR 420 |
|---|---|---|
| THE | 0:32:09 | |
| RAIN | 0:32:10 | 0:32:12 |
| IN | 0:32:11 | |
| SPAIN | 0:32:12 | 0:32:14 |
| FALLS | 0:32:13 | |
| MOSTLY | 0:32:14 | |
| ON | 0:32:16 | 0:32:18 |
| THE | 0:32:17 | 0:32:19 |
| | | |
| I AM | 1:12:11 | |
| AM THE | 1:12:12 | |
| THE VERY | 1:12:13 | 1:12:24 |
| VERY MODEL | 1:12:14 | |
| MODEL OF | 1:12:15 | |
| OF A | 1:12:16 | |
| A MODERN | 1:12:17 | 1:12:28 |
| MODERN MAJOR | 1:12:18 | |

CLOSED CAPTION ALIGNMENT

BACKGROUND

Media content items such as television shows and movies often have audio tracks that include dialogue or other speech. To make such media content items more accessible to a wider range of audiences, the media content items may optionally include closed caption tracks. The closed caption tracks are designed so that words that are spoken in the audio track are also displayed in the form of readable text.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Aligning a closed caption track to a media content includes calculating the offset and the drift between the closed caption track and the media content item. The closed caption track is aligned to the media content item as a function of the calculated offset and drift.

DETAILED DESCRIPTION

An automated method of aligning a closed caption track to a media content item is disclosed. A speech recognizer is used to detect speech fragments from the audio track of a media content item. A speech fragment may include a single word, word pair, or three or more words. Using speech-recognition, the playback time of a recognized speech fragment within the media content item is determined and compared to an estimated speech time of the corresponding word or words from the closed caption track. The result of the comparison can then be used to align the entirety of the closed caption track with the media content item such that the individual captions are displayed with the correct timing.

Figure 1:
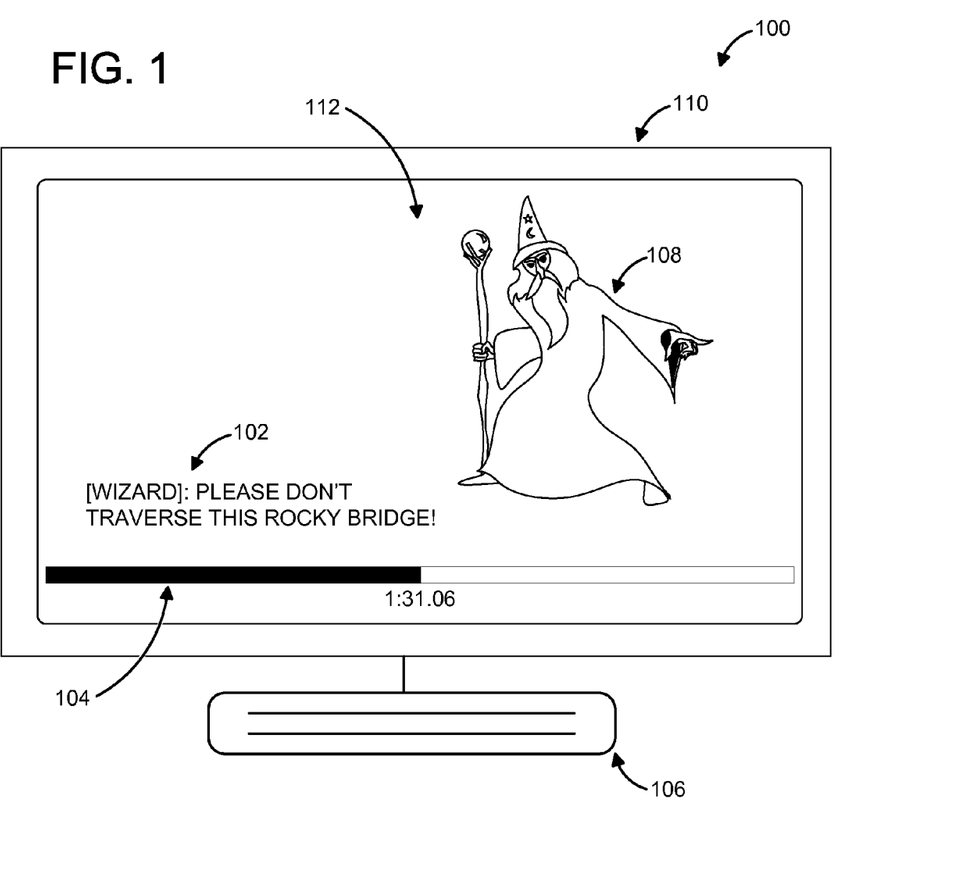
FIG. 1 shows an entertainment system displaying a media content item with a caption in accordance with an embodiment of the present disclosure.

FIG. 1 illustrates an exemplary entertainment system 100 including a display device 110 displaying a media content item 112 (e.g., movie) with a caption 102 and tracking bar 104. Caption 102 provides textual information that is related to media content item 112. In the illustrated example, caption 102 provides a textual representation of character dialogue as character 108 speaks the dialogue in the media content item.

Various situations may cause a closed caption track to be misaligned with a media content item. A misaligned closed caption track will display particular captions at the wrong times. For example, the textual representation of a character's dialogue will not be displayed while the character is speaking the dialogue. Such misalignment may occur when closed caption tracks are created and applied to media content items that were not originally created with closed caption tracks, for example.

Figure 2:
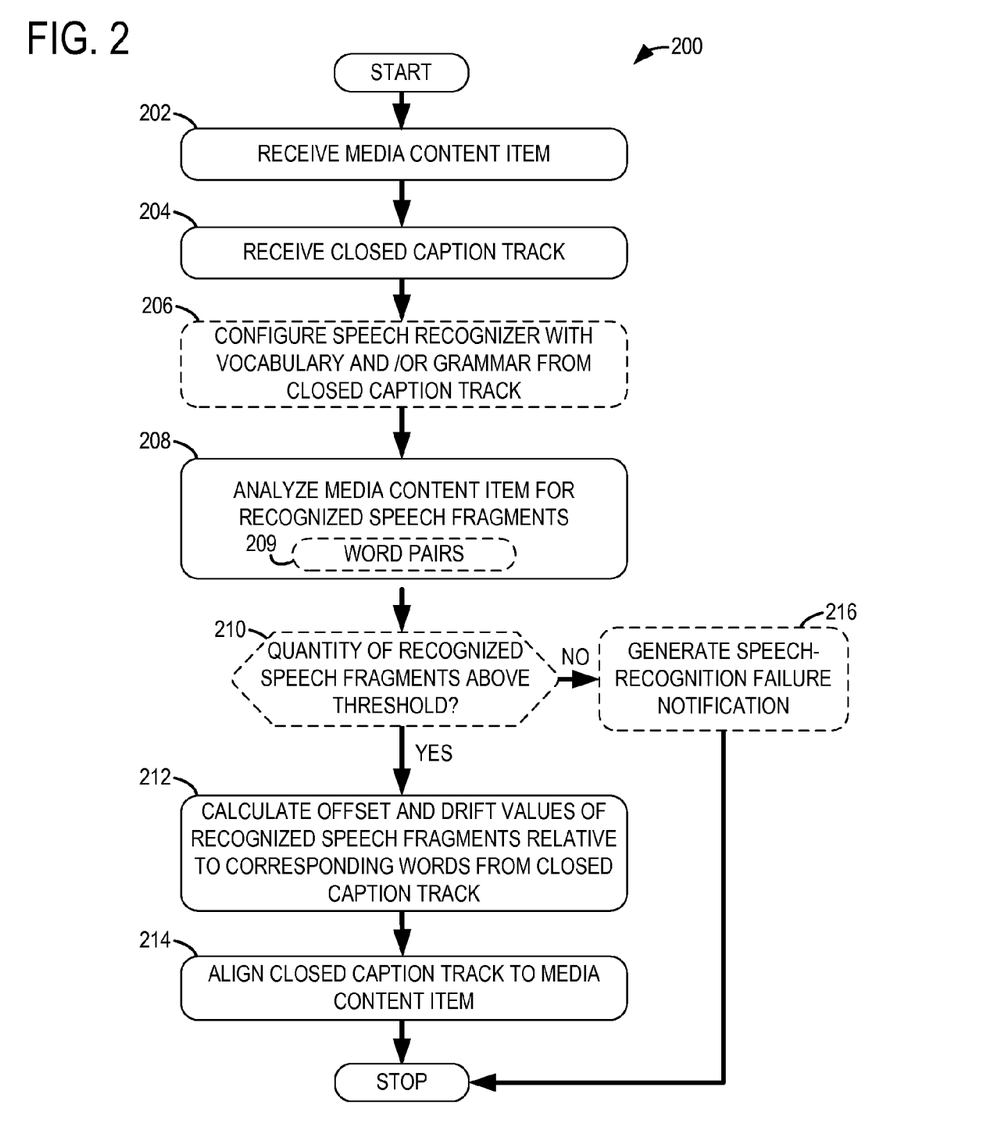
FIG. 2 shows a method of aligning a closed caption track to a media content item in accordance with an embodiment of the present disclosure.

FIG. 2 shows a method 200 for aligning a closed caption track to a media content item. At 202, method 200 includes receiving the media content item. The media content item may be virtually any type of visual content item. For example, the media content item may be an audio-visual stream, audio-visual recording, visual-only stream, visual-only recording, etc. that embodies a movie, television program, game, internet video, etc. The media content item may be saved in virtually any analog or digital format.

At 204, method 200 includes receiving the closed caption track. The closed caption track includes a plurality of captions associated with the media content item. The closed caption track may be saved in any suitable format.

Figure 3:
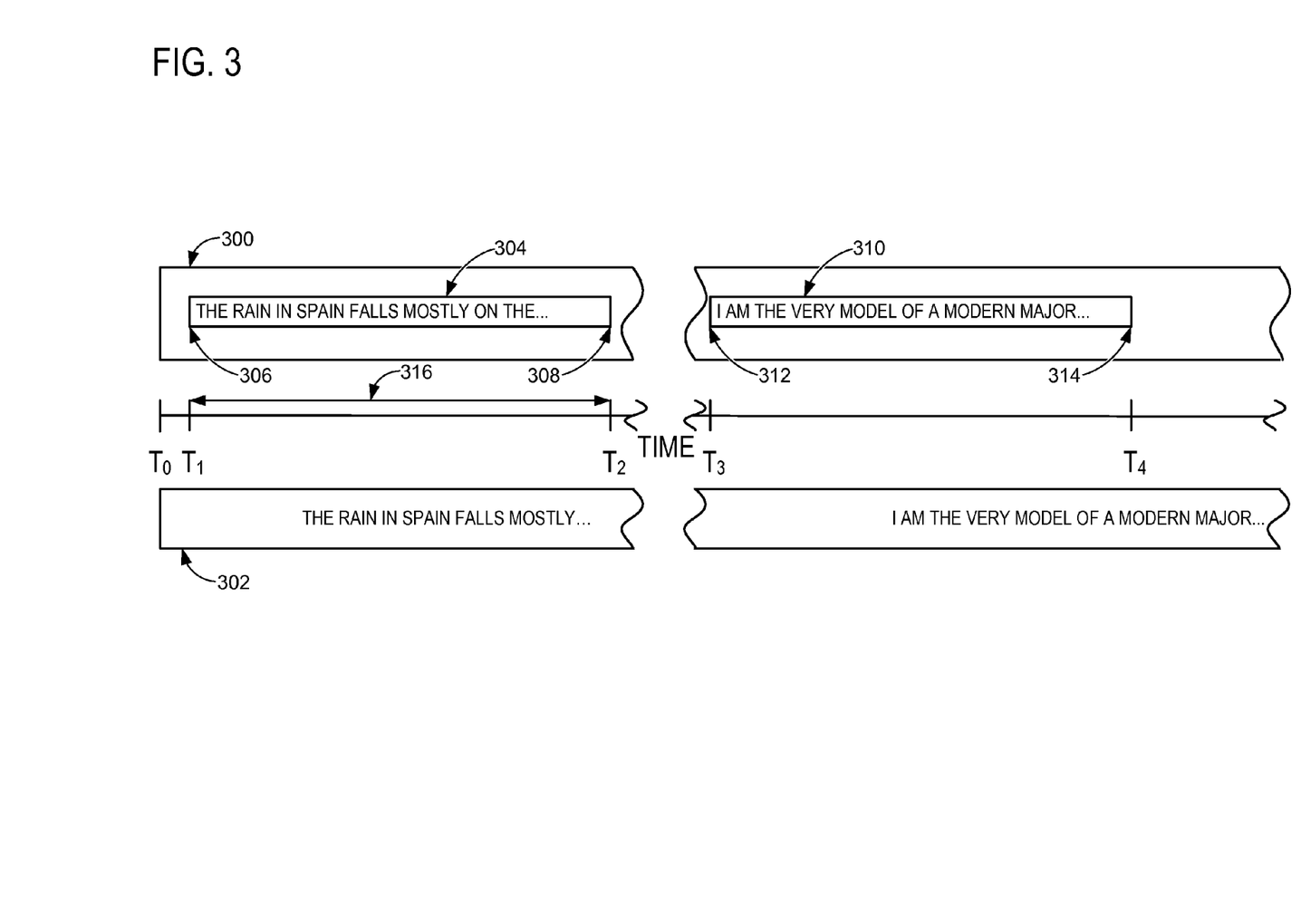
FIG. 3 schematically shows a closed caption track that is not properly aligned with a media content item.

FIG. 3 schematically shows an audio track 302 of a received media content item and a corresponding received closed caption track 300 before alignment. It is to be understood that the audio track 302 of the media content item is schematically illustrated in a visual format with text representing the words recorded as part of the audio track of the media content item. Likewise, the closed caption track 300 is schematically illustrated in a visual format. In practice, the audio track may be received in a format such as MP4, and the closed caption track may be received in a format such as XML.

The received closed caption track 300 includes a plurality of captions, for example caption 304 and caption 310. Each caption has a display time that indicates when the caption is to be displayed. Further, each caption has an end time that indicates when display of the caption is to end. As such, each caption has a caption duration between the caption display time and the caption end time. For example, caption 304 has a caption display time 306 of $T_1$, a caption end time 308 of $T_2$, and a caption duration 316 of $\Delta T = T_2 - T_1$. Caption 310 is shown with a caption display time 312 of $T_3$ and a caption end time 314 of $T_4$. The caption display time may be encoded in the closed caption track with a caption end time and/or a caption duration. As introduced above, the caption alignment methods described herein may be used to align each caption with an appropriate portion of the media content item.

Many captions may include two or more words, and many captions will often include many words. However, the display of all words in the same caption is typically dictated by the caption display time and the caption end time and/or caption duration. In other words, the eleventh word in the caption does not have an encoded time that is particular to that word. In order to align a specific word in the closed caption track with the corresponding word in the media content item, it may be useful to estimate a time when that specific word is to be spoken in the media content item. This disclosure refers to that time as the estimated speech time.

However, it is to be understood that all words in the caption typically are displayed at the same time—the caption start time.

The estimated speech time may be calculated using a variety of different approaches. In general, the estimated speech time may be calculated using the caption start time and any suitable approach for estimating the time a particular word is to be spoken after the caption start time. For example, if the caption includes ten words and has a ten second caption duration, one estimation approach may calculate the first word's estimated speech time at 0 seconds (relative to caption start time), the second word's estimated speech time at 1 second, the third word's estimated speech time at 2 seconds, and so on until the tenth word's estimated speech time at 9 seconds. In other words, the caption duration may be divided by the number of caption words, and this quotient may be multiplied by a particular word's position within the caption. Other approaches may utilize a standard rate of speech to estimate a speech time within a caption.

Returning to FIG. 2, at 206, method 200 optionally includes configuring an automated speech recognizer to speech recognize a plurality of different speech fragments present within the closed caption track. A vocabulary of words and/or grammar specific to the closed caption track may be used to configure the speech recognizer. In particular, the speech recognizer may be supplied with a vocabulary that includes only the words that are present in the closed caption track, or a particular portion of the closed caption track (e.g., one or more specific captions). The speech recognizer may be programmatically supplied with the vocabulary in XML format or by any other acceptable method. Speech-recognition may be improved by reducing the words for which the automated speech recognizer "listens" to only those words present in the closed caption track. As examples, the recognition rate of words may be improved, the number of false recognitions may be limited, a rate of detection may be increased, and/or the speech recognizer may become more resilient to background (i.e., not speech) noise. Furthermore, words within the closed caption track that may be easily confused by the speech recognizer may be identified and omitted from the vocabulary.

Optionally, the automated speech recognizer may be supplied with a vocabulary from a subset of words occurring within a specific temporal range of the closed caption track. As one example, the speech recognizer may be configured to listen to a particular portion of the media content item using a vocabulary that includes only speech fragments having estimated speech times that correspond to the playback time of the particular portion.

The temporal range for speech-recognition analysis within the media content item may be larger than and contain the temporal range from the closed caption track(s) to increase the probability of speech-detection. For example, a speech recognizer may be supplied with words from one or more particular captions beginning at 3:31:23 and ending at 3:31:33, and the speech recognizer may analyze a media content item from 3:29:23 to 3:33:33 while in this configuration. Using this approach, the speech recognizer attempts to find all words in one or more particular captions.

Using another approach, a speech recognizer may attempt to recognize all words that exist in a particular segment of a media content item. For example, a 10 second segment of the media content item beginning at 3:31:23 and ending at 3:31:33 may be analyzed with a speech recognizer that is supplied with a vocabulary of words including only those words with estimated speech times between 3:29:23 and 3:33:33.

In the above examples, a +/−2 minute buffer is provided. However, it should be understood that other buffers may be used, including dynamic buffers that change duration based on one or more parameters (e.g., previously detected offset values).

At 208, method 200 includes analyzing the media content item with the speech-recognizer. The speech recognizer may "listen" for the words in its vocabulary. This may be accomplished by acoustic-phonetic detection or virtually any other acoustic detection method. For example, the English language uses approximately 40 phonemes to construct over 500,000 words. These phonemes may be considered the acoustic building blocks from which all words are built. The speech analyzer may extract the phonemes composing the words within detected speech fragments from the media content item for speech-recognition processing. As an example, the speech recognizer could extract the phonemes "t" and "uw" from the spoken word "too." The extracted phonemes may then be recognized by a speech-recognition algorithm. The speech-recognition algorithm may utilize a Hidden Markov Model, Dynamic Time-warping, Neural Net, phonetic search, and/or any other suitable speech-recognition algorithm. Recognized speech fragments within the audio track of the media content item may then be translated to text. The text output of the speech recognizer may then be cross-checked against the text of the closed caption track to assess accuracy and/or calculate an error rate for the speech-detection analysis. Additionally, the speech recognizer may recognize the corresponding playback time of the media content item of each recognized speech fragment.

Figure 4A:
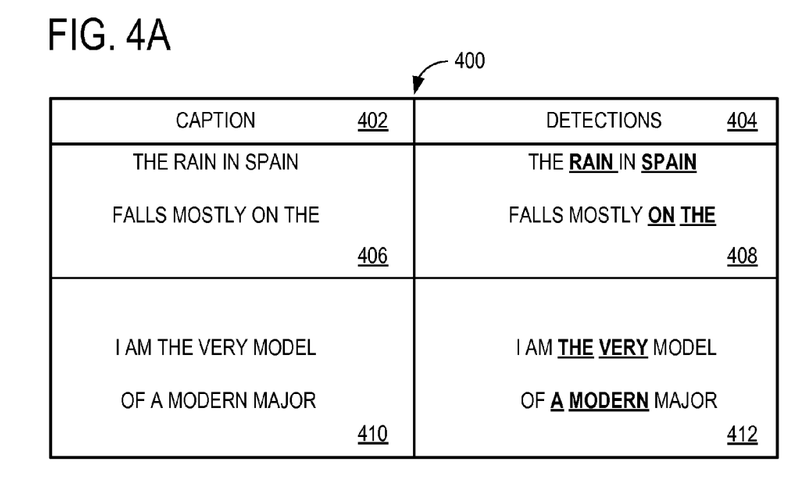
FIGS. 4A and 4B schematically show speech detection of words and word pairs in accordance with embodiments of the present disclosure.
Figure 4B:
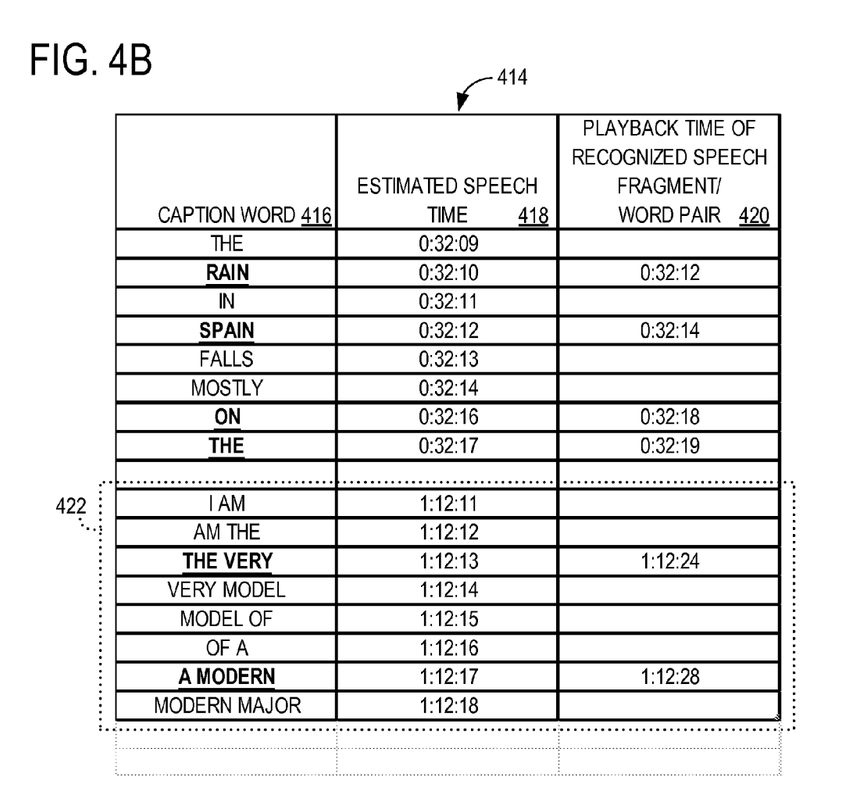

FIG. 4A and FIG. 4B schematically represent an automated speech-recognition analysis of two different portions of a media content item. In FIG. 4A, the caption words that may be used to configure the speech recognizer are listed in column 402 of Table 400. Column 404 shows the words within recognized speech fragments in bold and underlined. For example, blocks 406 and 410 of FIG. 4A schematically show the caption words that may be supplied to the speech recognizer. Blocks 408 and 412 schematically show the words within recognized speech fragments within each caption.

Table 414 of FIG. 4B represents the results of a speech-recognition analysis of the media content item in tabular form. For each caption word listed in column 416, there is an estimated speech time listed in column 418. If the caption word is speech-detected within the media content item, the playback time of the recognized speech fragment corresponding to that word is listed in column 420. A difference between an estimated speech time and a speech-detected playback time for a caption word is indicative of an offset value and/or a drift value present between the closed caption track and the media content item.

Returning to FIG. 2, as indicated at 209, the speech recognizer may optionally be configured to speech recognize adjacent word pairs within the media content item. For example, the speech recognizer may analyze each word pair incrementally throughout the media content item as shown at 422 in FIG. 4B column 416. Configuring the speech analyzer to recognize and record only speech-recognized adjacent word pairs may increase the accuracy of speech-detection, accuracy of the alignment process, and resilience of the speech recognizer to non-dialogue background noise within the audio track of the media content item.

Returning to FIG. 2, at 210 of method 200, the quantity of recognized speech fragments optionally may be compared to a threshold value. The threshold may be a detection percentage, for example. In other words, if a closed caption track has a total of 10,000 instances of words, and the threshold is set at 30%, the threshold would be 3,000 words. The threshold alternatively may be a set number of detected words without consideration for the total number of words. The threshold alternatively could be time dependent. For example, a threshold percentage or number of words could be used for two or more different segments of the media content item. If the quantity of speech-detected words is below the threshold, method 200 proceeds to 216, where a speech-recognition failure notification optionally may be generated. If the quantity of speech-detected words within the media content item is above the threshold, method 200 proceeds to 212.

At 212, method 200 includes calculating an offset value and a drift value of speech-recognized words relative to corresponding words from the closed caption track.

The offset value indicates a temporal shift in the closed caption track relative to the media content item. For example, the first spoken word of a media content item may occur at 0:00:03, but the closed caption track may be configured such that the corresponding caption does not display this first word until 0:00:06. In this example, the closed caption track is offset three seconds relative to the media content item. A closed caption track may have a positive or negative offset relative to the media content item. Such offset may be the result of different procedures being used to edit, encode, or otherwise produce the media content item and the closed caption track.

The drift value indicates a difference in a temporal rate of the closed caption track relative to a temporal rate of the media content item. For example, an early-occurring word in a closed caption track may occur at 0:00:03, a mid-occurring word in the closed caption track may occur at 0:45:03, and a late-occurring word in the closed caption track may occur at 1:30:03. Meanwhile, a corresponding speech-detected word corresponding to the early-occurring word may occur at 00:00:03, the speech-detected word corresponding to the mid-occurring word may occur at 00:45:04, and the speech-detected word corresponding to the late-occurring word may occur at 1:30:05. In this example, the duration between the early-occurring word and the mid-occurring word is 0:45:00 in the closed caption track and 0:45:01 in the media content item. Further, the duration between the mid-occurring word and the late-occurring word is 0:45:00 in the closed caption track and 0:45:01 in the media content item. In other words, the media content item is playing slower than the closed caption track. A closed caption track may play slower, faster, or at the same rate relative to the media content item. Such drift may be the result of different procedures being used to edit, encode, or otherwise produce the media content item and the closed caption track.

The offset value and the drift value may be calculated by comparing the playback times of a plurality of speech-recognized words from the media content item to the estimated speech times of the corresponding words from the closed caption track.

Figure 5:
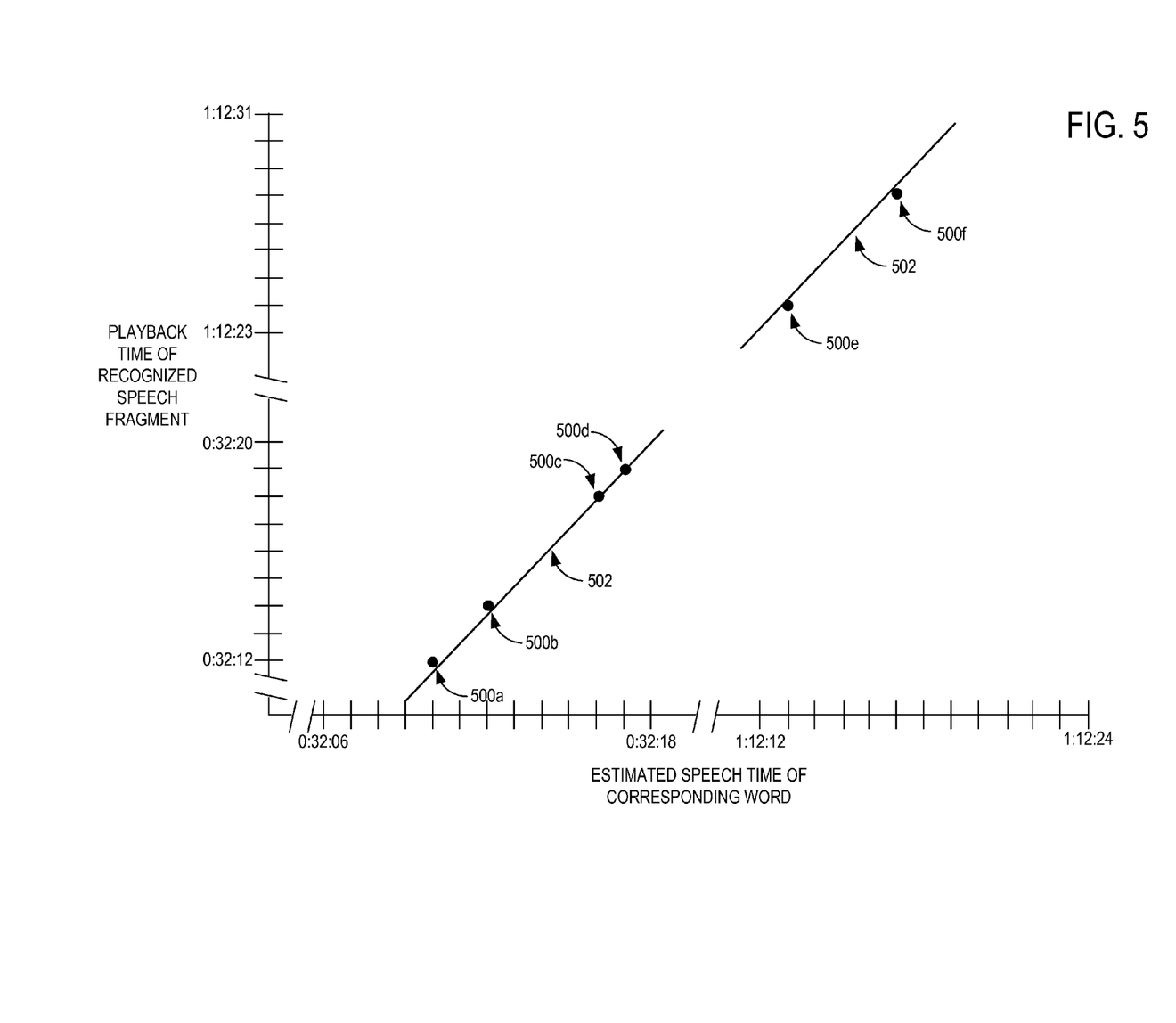
FIG. 5 schematically shows calculation of an offset value and a drift value in accordance with an embodiment of the present disclosure.

For example, FIG. 5 visually represents calculation of a drift value and an offset value by plotting the playback time of a speech fragment recognized from the media content item versus the estimated speech time of the corresponding word from the closed caption track. A function is then fitted to the plot. As a nonlimiting example, the function may be y=mx+b, where:

y=a playback time of a speech fragment recognized from the media content item,
x=an estimated speech time of a corresponding word of the closed caption track,
m=drift value, and
b=offset value.

Referencing the speech detection data in FIG. 4B, points 500*a*, 500*b*, 500*c*, and 500*d*, 500*e*, and 500*f* represent a plot of the playback times of speech fragments and/or word pairs from the media content item (FIG. 4B, column 420) versus the estimated speech times of the corresponding words from the closed-caption track (FIG. 4B, column 418). The best-fit function derived from the plotted points is illustrated as function curve 502.

The function for each plot may be derived using a Newton-Gauss regression method or any other suitable method.

It should also be understood that the presence of edits within the media content item may be detected as discontinuities within the function plot. For example, a media content item edited for television may have content added in the form of commercial breaks or removed for the purpose of airing within the allowed network time. These edits will result in spontaneous, step-wise vertical displacements within the plot of the speech-detected times of words within the media content item versus the estimated speech times from the closed caption track. Detection of these spontaneous vertical displacements may be used to predict and define the associated edits of the media content item. Thus, the vertical displacements may be accounted for in the derivation of the function.

The function may be used to calculate the playback time within the media content item from the estimated speech time of each caption word.

Returning to FIG. 2, at 214 method 200 includes aligning the closed caption track to the media content item as a function of the drift value and the offset value. In the case of a misaligned closed caption track, the caption display times and caption end times within the closed caption track may also be adjusted to corrected times as a function of the offset and drift values.

Optionally, the function may be used to calculate the playback time within the media content item from each caption display time provided by the closed caption track. Additionally, the function may also be used to calculate the playback time within the media content item of each provided caption end time. When a caption duration is provided, the caption end time may be calculated using the calculated playback time for a given caption display time and the caption duration. The calculated playback times for each caption display time, caption duration, and/or caption end time may then be used to align the closed caption track to the media content item.

Figure 6:
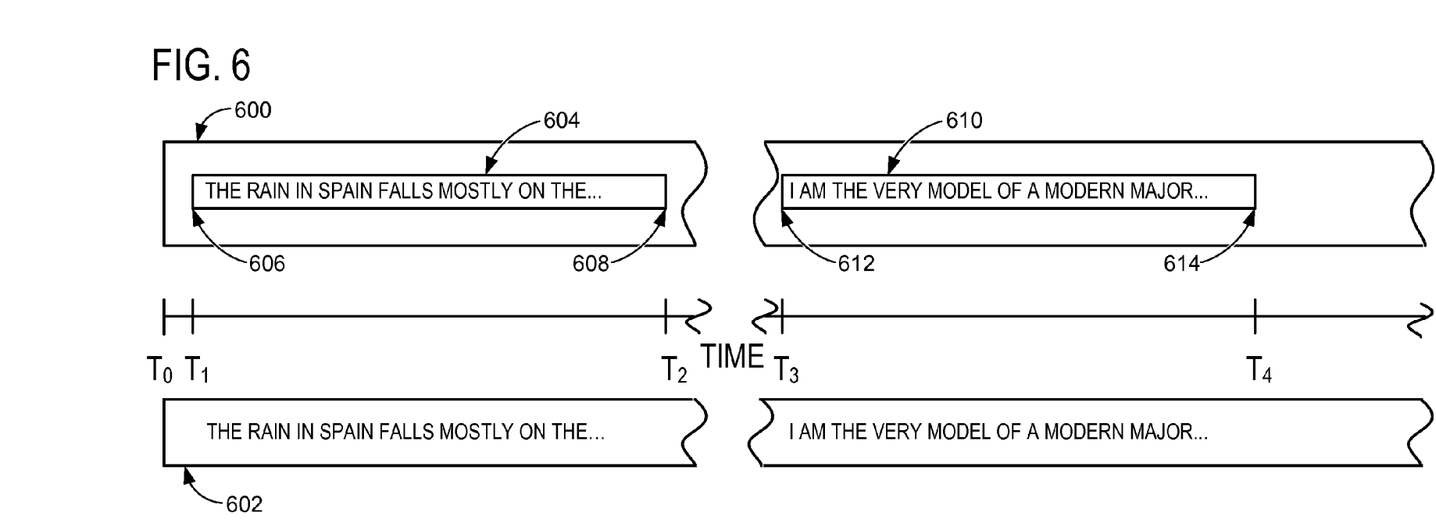
FIG. 6 schematically shows the closed caption track of FIG. 3 properly aligned with the media content item of FIG. 3.

FIG. 6 illustrates a closed caption track 600 aligned with the audio track 602 from the media content item. In other words, the caption display times 606 and 612 of their respective captions 604 and 610 are adjusted such that the captions are displayed with the correct timing. Caption end times 608 and 614 are adjusted to end the display of their respective captions at the proper time.

After completion of the alignment of the closed caption track to the media content item, the aligned closed caption track may be encoded to the media content item in any suitable way.

The embodiments described above may also be applied to other forms of captioning including, but not limited to, open captions and subtitles.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
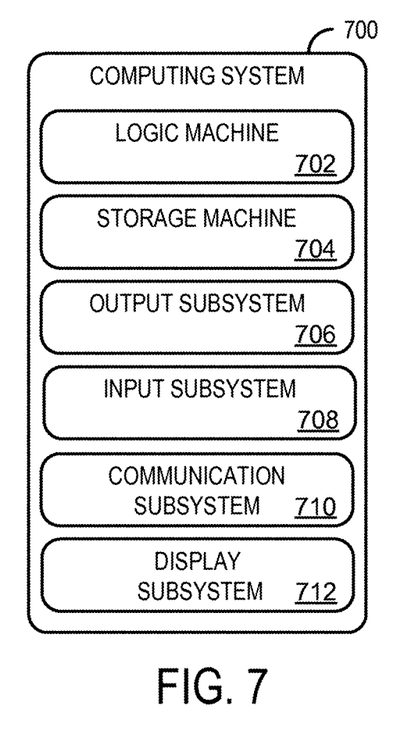
FIG. 7 schematically shows a computing system in accordance with an embodiment of the present disclosure.

FIG. 7 schematically shows a non-limiting embodiment of a computing system 700 that can enact one or more of the caption-alignment methods and processes described above. As a nonlimiting example, entertainment system 106 from FIG. 1 may be an example of computing system 700. As another example, computing system 700 may take the form of a media-labeling system useable by a media distributor. Computing system 700 is shown in simplified form. Computing system 700 may take the form of one or more home-entertainment computers, gaming devices, personal computers, tablet computers, network computing devices, mobile computing devices, mobile communication devices (e.g., smart phone), server computers, and/or other computing devices.

Computing system 700 includes a logic machine 702 and a storage machine 704. Computing system 700 may optionally include an output subsystem 706, input subsystem 708, communication subsystem 710, display subsystem 712, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 712 may be used to present a visual representation of data held by storage machine 704. This visual representation may take the form of a graphical user interface (GUI). As the herein described methods and processes change the data held by the storage machine, and thus transform the state of the storage machine, the state of display subsystem 712 may likewise be transformed to visually represent changes in the underlying data. Display subsystem 712 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for aligning a closed caption track to a media content item including a plurality of different speech fragments, the method comprising:
   fitting a function to the plurality of different speech fragments;
   calculating, based on the function, an offset value that indicates a temporal shift in the closed caption track relative to the media content item;

calculating, based on the function, a drift value that indicates a difference in a temporal rate of the closed caption track relative to a temporal rate of the media content item;

aligning a start time of the closed caption track to a start time of the media content item; and changing the temporal rate of the closed caption track based on the drift value to match the temporal rate of the media content item.

2. The method of claim 1, wherein the offset value and the drift value are calculated by comparing a playback time of each of the plurality of different speech fragments and an estimated speech time of a corresponding word from the closed caption track.

3. The method of claim 2, further comprising supplying a speech recognizer with a vocabulary and/or grammar from the closed caption track to speech recognize the plurality of different speech fragments.

4. The method of claim 3, wherein the speech recognizer is configured to speech recognize word pairs within the plurality of different speech fragments recognized from the media content item.

5. The method of claim 3, further comprising supplying the speech recognizer with a vocabulary and/or grammar from a subset of words occurring within a temporal range of the closed caption track, and using the speech recognizer to search a corresponding temporal range of the media content item for any of the subset of words within the plurality of different speech fragments recognized from the media content item.

6. The method of claim 5, wherein the corresponding temporal range of the media content item is greater than and includes the temporal range of the closed caption track.

7. The method of claim 2, further comprising outputting a notification of speech-recognition failure if the plurality of speech-recognized words within the plurality of different speech fragments recognized from the media content item is below a threshold.

8. The method of claim 2, wherein the function relates a playback time of each speech fragment recognized from the media content item to an estimated speech time of the corresponding word of the closed caption track.

9. The method of claim 8, wherein the function is y=mx+b, and:
y=a playback time of a speech fragment recognized from the media content item,
x=an estimated speech time of a corresponding word of the closed caption track,
m=drift value, and
b=offset value.

10. The method of claim 8, wherein the closed caption track is aligned to the media content item based on the function.

11. The method of claim 10, wherein the closed caption track is aligned to the media content item by setting the start time of each caption within the closed caption track to a corrected caption start time according to the function, the corrected caption start time representing a playback time within the media content item.

12. The method of claim 2, wherein the estimated speech time of the corresponding word from the closed caption track is estimated from a caption start time and a position of the corresponding word within the caption.

13. A hardware storage machine holding instructions executable by a hardware logic machine, the instructions comprising:

instructions executable by the hardware logic machine to analyze a media content item for a plurality of different speech fragments using a speech recognizer supplied with a vocabulary and/or grammar from a corresponding closed caption track;

instructions executable by the hardware logic machine to fit a function to the plurality of different speech fragments;

instructions executable by the hardware logic machine to calculate an offset value based on the function that indicates a temporal shift in the closed caption track relative to the media content item;

instructions executable by the hardware logic machine to calculate a drift value based on the function that indicates a difference in a temporal rate of the closed caption track relative to a temporal rate of the media content item; and instructions executable by the hardware logic machine to align a start time of the closed caption track to a start time of the media content item; and instructions executable by the hardware logic machine to change the temporal rate of the closed caption track based on the drift value to match the temporal rate of the media content item.

14. The storage machine of claim 13, wherein the speech recognizer is configured to speech recognize word pairs within the plurality of different speech fragments recognized from the media content item.

15. The storage machine of claim 13, further comprising providing the speech recognizer with a vocabulary and/or grammar from a subset of words occurring within a temporal range of the closed caption track, and using the speech recognizer to search a corresponding temporal range of the media content item for any of the subset of words within the plurality of different speech fragments recognized from the media content item.

16. The storage machine of claim 13, wherein the function relates a playback time of each speech fragment recognized from the media content item to an estimated speech time of the corresponding word of the closed caption track.

17. The storage machine of claim 16, wherein the function is y=mx+b, and:
y=a playback time of a speech fragment recognized from the media content item,
x=an estimated speech time of a corresponding word of the closed caption track,
m=drift value, and
b=offset value.

18. The storage machine of claim 16, wherein the closed caption track is aligned to the media content item based on the function.

19. The storage machine of claim 13, wherein the estimated speech time of the corresponding word from the closed caption track is estimated from a caption start time and a position of the corresponding word within the caption.

20. A method for aligning a closed caption track to a media content item, the method comprising:

analyzing the media content item for a plurality of different word pairs within speech fragments recognized from the media content item using a speech recognizer configured with a vocabulary from the closed caption track;

calculating an offset value and a drift value between the closed caption track and the media content item based on a comparison of a playback time within the media content item for each of the plurality of different word pairs within speech fragments recognized from the media content item and an estimated speech time of a corresponding word pair from the closed caption track, the offset value indicating a temporal shift in the closed caption track relative to the media content item, and the drift value indicating a difference in a temporal rate of the closed caption track relative to a temporal rate of the media content item; and aligning the closed caption track to the media content item as a function of the drift value and the offset value.

* * * * *